(No Model.) 4 Sheets—Sheet 1.

H. G. & C. F. WALTER.
CASH INDICATOR.

No. 543,162. Patented July 23, 1895.

Fig.1.

Witnesses.
G. F. Downing
D. G. Nottingham

Inventors.
H. G. Walter
C. F. Walter
By H. A. Seymour
Attorney.

(No Model.) 4 Sheets—Sheet 2.

H. G. & C. F. WALTER.
CASH INDICATOR.

No. 543,162. Patented July 23, 1895.

Witnesses.
J. F. Coleman
G. F. Downing

Inventors
H. G. Walter
C. F. Walter
By H. A. Seymour
Att'y (No Model.) 4 Sheets—Sheet 4.
H. G. & C. F. WALTER.
CASH INDICATOR.
No. 543,162. Patented July 23, 1895.

Fig. 4

Witnesses.
J. F. Coleman
G. F. Downing

Inventors
H. G. Walter
C. F. Walter
By H. A. Seymour
Atty.

UNITED STATES PATENT OFFICE.

HENRY G. WALTER AND CHARLES F. WALTER, OF SCRANTON, PENNSYLVANIA.

CASH-INDICATOR.

SPECIFICATION forming part of Letters Patent No. 543,162, dated July 23, 1895.

Application filed May 6, 1893. Serial No. 473,299. (No model.)

*To all whom it may concern:*

Be it known that we, HENRY G. WALTER and CHARLES F. WALTER, of Scranton, in the county of Lackawanna and State of Pennsylvania, have invented certain new and useful Improvements in Cash Indicators and Recorders; and we do hereby declare the following to be a full, clear, and exact description of the invention, such as will enable others skilled in the art to which it appertains to make and use the same.

Our invention relates to an improvement in cash indicators and recorders, the object of the invention being to produce a cash-indicator which shall be compact in construction, cheap to manufacture, and comprising a comparatively small number of parts.

A further object is to construct a cash-indicator in such manner that all the targets can be effectually manipulated through the medium of four or less key-levers.

A further object is to produce simple devices for unlocking and forcing the drawer open.

A further object is to produce simple and efficient printing mechanism to be used in connection with a cash-indicator.

A further object is to produce means for locking and unlocking the drawer and simultaneously sounding an alarm.

A further object is to provide improved means for preventing the operation of more than one key at a time.

A further object is to improve, simplify, and render compact a cash-indicator, and to so construct it that it shall in every respect be effectual in the performance of its functions.

With these objects in view the invention consists in certain novel features of construction and combinations and arrangements of parts, as hereinafter set forth, and pointed out in the claims.

In the accompanying drawings, Fig. 3 is a section on the line $y\,y$ of Fig. 2.

A represents a casing or framework. A series of (preferably four) key-levers B are pivotally supported at a point between their ends in the framework A at the base thereof and extend from the inner end to points in proximity to the outer or forward end of said framework. A series of vertically-movable rods or bars C are maintained in a vertical position by means of suitable guides $a$ and normally rest on the key-levers B in proximity to their free outer or forward ends, said rods or bars being maintained normally at the lower extremity of their movement by means of springs $b$. Located above and in alignment with the bars or rods C are vertically-movable bars C′, said bars C′ being maintained in a vertical position and supported by means of a series of guides $b'$ and maintained normally at the lower extremity of their throw by means of springs $b^2$. The bars C′ are limited in their downward movement by means of a lug or ear $c$, (one lug or ear on each,) adapted to rest upon one of the guides $b'$. When the bars C C′ are in their normal positions there will be a space $c'$ between them, the purpose of which will become apparent farther on in this description.

At or near its upper end each bar C′ is made with rack-teeth $d$, thus producing a rack-bar, said teeth being adapted to mesh with pinions D journaled in the framework in proximity to the top thereof. The pinions D are also adapted to mesh with rack-teeth $d'$ on bars D′, which latter bars are supported by suitable guides $d^2$ and adapted to have a movement at right angles to the bars C′. Each horizontal bar D′ (there being four in number, the same as the number of vertical bars C and C′) is provided to one side of the toothed portion thereof with a series of (preferably 10) openings or perforations $f$, through which a corresponding number of target-bars E project, each target-bar being provided with a target E′. The target-bars are supported and limited in their downward movement by means of lugs or ears $g$ projecting from them and resting on the bars D′.

Mounted in suitable guides $g'$ and just in advance of the first target-bar of each series of target-bars (when the target-bars are all in their normal positions) is a vertically-sliding rod F, said rods normally resting upon and being supported by a series of levers F′, each of which is pivoted at its end to a portion of the framework. Loosely connected to each lever F′ is a depending link $F^2$, and the lower ends of the links $F^2$ are pivotally connected to one end of a series of levers $F^3$, the latter being pivotally connected at points between their ends to the framework. The free ends of the pivoted levers $F^3$ terminate in close proximity to the vertically-movable bars C and disposed between lugs or collars $h$ $h'$ thereon. From this construction and arrangement of parts it will be seen that when one of the rods or bars C′ is moved vertically the horizontal bar D′ will be moved (through the medium of the interposed pinion) to the extent to which the vertical bar C′ is moved, and thus one of the target-bars E will be moved immediately over the rod F. The bar C′ will be forced upwardly to cause the parts to assume the positions just described by the vertical movement of a bar C, the bar C being forced upwardly by a key-lever. When one of the bars C is forced upwardly the lug $h'$ thereon engages the lever $F^3$, causing it to turn on its pivot, thus through the medium of the link $F^2$ drawing down the lever F′ and permitting the rod F to descend. Now, when the key-lever is released and the bar or rod C forced downwardly to its normal position by the spring $b$, the lug $h$ on the bar or rod C will engage the lever $F^3$ and cause it to turn on its pivot in the opposite direction to that above described, this movement of the lever $F^3$ forcing up the link $F^2$ and the lever F′ attached at its upper end, thereby raising the rod F resting on said lever F′ and causing the target-bar directly over it to rise and display its target in the opening $h^2$ in the casing A.

Each of the four key-levers B is adapted to be operated by means of a series of (preferably ten) key-rods G, having keys or buttons G′ thereon, and each key is provided with a figure, the figures of one set of keys indicating cents, the figures of another set of keys denoting dimes, another series denoting dollars, and the last series denoting tens of dollars. We prefer to employ four series of keys, but it is evident that three series will suffice.

The key-rods G will be passed through suitable perforations in the casing and will preferably be guided by suitable perforated plates $i$, the rods G of each series normally resting on its respective key-lever B. At a point near where the key-rods pass through the casing they are provided with pins or projections $j$, and a coiled spring $j'$ is made to encircle each key-rod, said springs bearing at their upper ends against the pins or projections $j$ and at their lower ends on the plates $i$, thus maintaining said key-rods normally at their uppermost positions, the key-rods of each set being all arranged over one key-lever and extend from one extremity thereof toward the fulcrum, and all the keys are adapted to be depressed to the same extent. Thus it will be seen that when a key near the inner end of a series is depressed the corresponding key-lever B will be turned on its fulcrum to a less extent than it would be if the last or innermost key were depressed, the latter being nearer to the fulcrum of the lever than the former and all the keys of the series being pressed to the same extent. For example, suppose the key denoting five cents be pressed, the corresponding key-lever B will move on its fulcrum sufficiently to cause the bar or rod C to move upwardly and engage the corresponding bar C′ and move the latter upwardly to an extent sufficient to cause five of its teeth to mesh with a similar number of teeth of the pinion D, which motion of the pinion will be transmitted to the corresponding horizontal bar D′ and said bar moved to the extent of five teeth, such movement being sufficient to bring the target-bar carrying the target having the figure "5" produced thereon directly over the vertically-movable rod F. When the key-rod 5 shall have been released, the rod or bar C will fall and the target-bar and target carried thereby will be shot upwardly in the manner above explained.

It is necessary that a key-rod be depressed to its full extent; otherwise a false indication will be made; but it frequently happens that an operator will partially depress a key, and finding that he has but partially depressed it will depress it again, resulting in displaying the wrong target. To avoid this, each key-rod G is provided with ratchet-teeth $k$, with which dogs $k'$, pivotally supported by the framework, are adapted to engage, so that when a key is partially depressed it will remain in the position to which it shall have been depressed instead of returning to its normal position, and a further depression of the key simply completes the movement of the key-rod and the proper target will be displayed. A large tooth $k^2$ projects from each key-rod G above the series of ratchet-teeth and each dog $k'$ is made with an arm or projection $k^3$. From this construction it will be seen that when a key-bar is depressed to its full extent the tooth $k^2$ will engage the arm or projection $k^3$ of the dog $k'$ and force said dog out of mesh with the ratchet-teeth and permit the rod to assume its normal position.

As before explained, the depression of a key causes the corresponding key-lever to turn on its fulcrum and force up the corresponding bar C, and the bar C will engage the bar C′ and force it upwardly in order to set the target mechanism. Now, it is desirable that the bar C′ should not immediately return and thus cause the target displayed to immediately drop when pressure is relieved from a key, and therefore the improved devices now to be described will be employed in order to retain the bar C′, which has been operated in its elevated position to retain the target displayed until the indicator shall again be operated. Arranged in proximity to the series of vertically-movable bars C' is an eccentric shaft H, preferably covered with rubber, leather, or similar material $l$, thus constituting a friction-clutch to retain the bar C' elevated. A bar $l'$ is pivotally supported in proximity to the eccentric-shaft or friction-clutch H, and is adapted, when turned, to engage an arm H' projecting therefrom. An arm $m$ projects from each end of the bar $l'$, and to these arms rods $m'$ are connected, the lower ends of said rods being connected with arms $m^2$, projecting from the respective ends of a pivotally-supported bar $l^2$, disposed over the forward or outer ends of the key-levers B. Now, when a key-lever is operated it will strike the bar $l^2$ and turn it, which motion is transmitted through the rods $m'$ to the bar $l'$, which latter will strike the arm H' of the clutch-shaft H and cause said clutch-shaft to make a partial revolution, thus releasing the vertically-movable bar C', which may have been elevated by a previous operation of the machine. When the bar C' shall have been thus released it will be forced downwardly by its spring $b^2$, thus causing the horizontal bar D' to move back to its normal position in an obvious manner and release the target previously displayed. Instead of producing the friction-clutch by the provision of the eccentric-shaft H, a concentric shaft H² may be employed and a spring-actuated friction-clutch H⁴ secured thereto, as shown in Fig. 7, and adapted to bear on the vertically-movable bars C'.

It will be seen that when a key-lever is operated the corresponding vertical bar C and the bar $l^2$ will be operated at the same time, and that the time required for said bar C to pass through the space $c'$ will be sufficient to permit the devices just described for returning the targets to their normal positions to operate, and there will, therefore, be no conflict between the devices for projecting or shooting the targets and the devices for causing them to return to their normal positions.

In order to reset the clutch-shaft H, the drawer I of the machine will be provided with an arm or bracket $n$, adapted to strike a pivoted lever $n'$ when the drawer is closed, said pivoted lever being, in turn, adapted to strike the bar $l^2$ and move it in position to be again operated by a key-lever.

In order to provide simple and efficient means for locking and unlocking the drawer I, the devices now to be described will be employed. A bracket is made to project from a portion of the framework A, and to its free end a lever J is pivoted, the end of one arm of said lever being provided with a weight $o$ and the other arm $o'$ being bent so as to project over key-lever B of the "cents" series of key-rods. To the weighted arm of the lever J a rod or bar J' is pivotally connected, the lower end of said rod being pivotally attached to a locking-bar J². The locking-bar J² is pivotally supported at its center and at its free end engages the end of the drawer I. A lever K is pivoted to the framework of the machine over the end of the drawer I (when the latter is closed) and is made with a curved arm K', adapted to project behind the end of the drawer and engage the same when closed. From this construction and arrangement of parts it will be seen that when one of the key-rods of the cents series is depressed, turning the corresponding key-lever B on its fulcrum, the latter will engage the lever J and move the arm $o'$ thereof upwardly and the weighted arm downwardly, thus causing the locking-bar J² to turn on its pivotal support and move out of contact with the end of the drawer. When the free end of the locking-bar is thus moved upwardly, it will strike the arm $p$ of the lever K and cause the curved arm K' of said lever to engage the end of the drawer and force it out, said drawer being preferably mounted on small rollers $p'$, so as to cause it to move easily.

It is often desirable to print the amount indicated by the machine on a slip of paper, and for this purpose the devices next to be explained are employed, said devices being arranged in the center of the machine, while the target-bars are at each side thereof.

A series of four horizontally-movable bars D² are mounted in the framework of the machine and are connected, respectively, with the bars D' by means of yokes D³, so that when one of the bars D' is moved the bar D² connected therewith will also be moved. Each bar D² is provided with a series of perforations $q$ for the accommodation of a series of vertically-movable type-bars $q'$, corresponding in number with the target-bars, and each type-bar is provided with a type $q^2$, corresponding, respectively, with the targets. Said type-bars are maintained normally at the upper extremity of their movement by means of springs $q^4$ which encircle them, one end of said springs bearing against the bar D² and the other ends against a pin or projection on the type-bars, the latter being prevented from moving too far upwardly by means of lugs or ears $q^5$, which project from said type-bars and rest against the under face of the movable bars D². Disposed in the center of the machine below the type $q^2$ and supported by standards $r$ is a plate or table $r'$, over which paper and inking-ribbon are made to pass, in a manner presently explained.

Mounted in suitable bearings located on the base of the machine is a shaft $r^3$, on which a ratchet-wheel $r^4$ is secured and adapted to mesh with a ratchet-bar $r^5$ carried by the drawer I. The ratchet-bar $r^5$ is pivotally connected at one end to the drawer and maintained in engagement with the ratchet-wheel $r^4$ by means of a spring $r^6$, secured at one end to the drawer and bearing at its free end against the free end of said ratchet-bar. From this construction and arrangement of parts it will be seen that when the drawer I is opened the ratchet-wheel $r^4$ will be rotated and that when the drawer is closed the ratchet-bar $r^5$ will ride over the teeth of the ratchet-wheel, retrograde motion of the wheel being prevented by a pawl $r^{12}$. From the shaft $r^3$ a crank-arm $r^7$ projects and is connected to the lower end of a rod $r^8$. The upper end of the rod $r^8$ terminates in a yoke $r^9$, the arms of which are connected by a cross-bar $r^{10}$. The yoke $r^9$ and its cross-bar $r^{10}$ will be disposed immediately in front of the several series of type-bars, and in order to guide the yoke in its vertical movements are secured to the framework of the machine-guides $r^{11}$, between which guides the cross-bar $r^{10}$ of the yoke $r^9$ is adapted to move.

A roll of paper $s$ is mounted in the machine in proximity to the table or plate $r$, and the paper from this roll, after passing over a guide-roller $s'$, passes over the table and is wound on a drum $s^2$, said drum being provided with a toothed wheel $s^3$. A drum $s^4$, carrying paper $s^5$, is located near the drum $s^2$. The paper from the drum $s^4$ passes over the table in the reverse to that of the paper from the roll $s$ and between friction-wheels $s^6$ $s^7$, located near the front of the machine-casing, and after passing between these friction-wheels the strip of paper $s^5$ passes through a cutting device located close to the front wall of the casing, the section of paper or ticket cut off by said cutting device being adapted to fall through an opening in the front wall of the machine-casing. The roll $s^7$ is made to bear on the paper passing under it with a yielding pressure by means of a spring or springs $v$. The cutting device comprises a lever $s^8$, pivoted between its ends and carrying a cutter or knife $s^9$ at one end adapted to act in conjunction with an arm or finger $s^{10}$, secured to the front wall of the machine, said cutter-lever being adapted to be automatically operated in a manner hereinafter explained. The inking-ribbon $s^{11}$ is carried by a drum $s^{12}$, and after passing over the table or plate $r'$, between the papers thereon and the type, passes under a guide-roller $s^{13}$, and is finally wound on a drum $s^{14}$. The drum $s^{14}$ carries a toothed wheel $s^{15}$, and this toothed wheel is actuated by a pin $s^{16}$, projecting from the drum $s^4$. The pin $s^{16}$ also actuates a toothed wheel $s^{17}$, carried by a drum $s^{18}$, on which a second inking or carbon ribbon $s^{19}$ is wound and adapted to pass between the two strips of paper, thus pulling said ribbon from a drum $s^{20}$, located at the opposite side of the table. The friction-wheel $s^6$ is provided with a pin $t$, adapted to engage the cutter-lever $s^8$ when the machine is operated, and said friction-wheel $s^6$ also carries a bevel-pinion $t'$, adapted to mesh with and receive motion from a bevel-pinion $t^2$, carried by a vertical shaft $t^3$. The lower end of the vertical shaft $t^3$ carries a bevel-pinion $t^4$, which meshes with a bevel-pinion $t^5$, carried by the shaft $r^3$.

Now it will be seen that when a key is depressed the bar $D^2$ will be moved forward, as above explained, and one of the type-bars will be brought directly under the cross-bar $r^{10}$ of the yoke $r^9$. The operation of a key-lever also causes the drawer to be opened, as previously explained, and during the outward movement of the drawer the engagement of the ratchet-bar $r^5$ with the ratchet-wheel $r^4$ will cause a rotation of the shaft $r^3$, carrying the crank-arm $r^7$ with it. During the first half of the revolution of the shaft $r^3$ the movement of the crank arm will pull down the rod $r^8$ and yoke $r^9$, causing the cross-bar $r^{10}$ to engage the type-bar, which has been moved under it, and force the type carried by said type-bar down on the ribbon and cause an impression to be made on the paper under it. During the remainder of the revolution of the crank-arm $r^7$ the yoke will be returned to its normal position by means of its spring. The series of type-bars will be subsequently moved to their normal position by the return movement of the horizontal bar $D^2$, the means for effecting which have been fully explained. When the shaft $r^3$ is revolved, motion will be imparted to the friction-wheel $s^6$ through the intermediate gearing above described, thus pulling the paper $s^5$, on which a type shall have produced a figure, through the machine and through the opening in the front wall thereof. During the revolution of the friction-wheel $s^6$ the pin $t$ projecting therefrom will engage the lever $s^8$ and cause the knife $s^9$ to sever the portion of the strip of paper having the figure produced thereon, thus producing a ticket having the amount of a purchase printed thereon. When the paper $s^5$ is made to move as above set forth, the drum $s^4$ will be thereby made to revolve and the pin $s^{16}$ carried thereby will engage the toothed wheels $s^{14}$ and $s^{17}$ and move each one tooth, thus moving or feeding the ink-ribbons and the paper from the roll $s$. On the paper from the drum $s$ a detail account of the sales will be produced, while the amount of each sale printed on the strip $s^5$ will be cut off, as above explained.

It is desirable in machines of this class to provide some means for sounding an alarm when the machine is operated, and for this purpose the devices now about to be described will be employed. Pivotally connected to the lever J (preferably in proximity to one end thereof) is a link or links 12, and to the other end of said link or links the long arm 13 of a bell-crank lever 14 is pivotally connected. The bell-crank lever is pivotally connected at the juncture of its two arms to the framework of the machine, and its shorter arm 15 is adapted to strike a tooth 16 projecting from a pivoted clapper 17. The bell-clapper 17 is made to come into contact with a bell 18 when released from the bell-crank lever 14 by means of a spring 19, one end of which is secured to said clapper and the other end to the arm 20, which supports the bell. From this construction and arrangement of parts it will be seen that when the key-lever of the cents series of keys is depressed the lever J will be raised to release the drawer, as above explained, and at the same time the bell-crank lever 14 will be turned on its pivot and made to ride past the tooth 16, after which the spring 19 will cause the clapper 17 to strike the bell 18. By these means a simple and efficient alarm mechanism will be produced.

It now only remains to describe the construction and operation of the devices for preventing the operation of more than one key-lever at a time.

Figure 1:
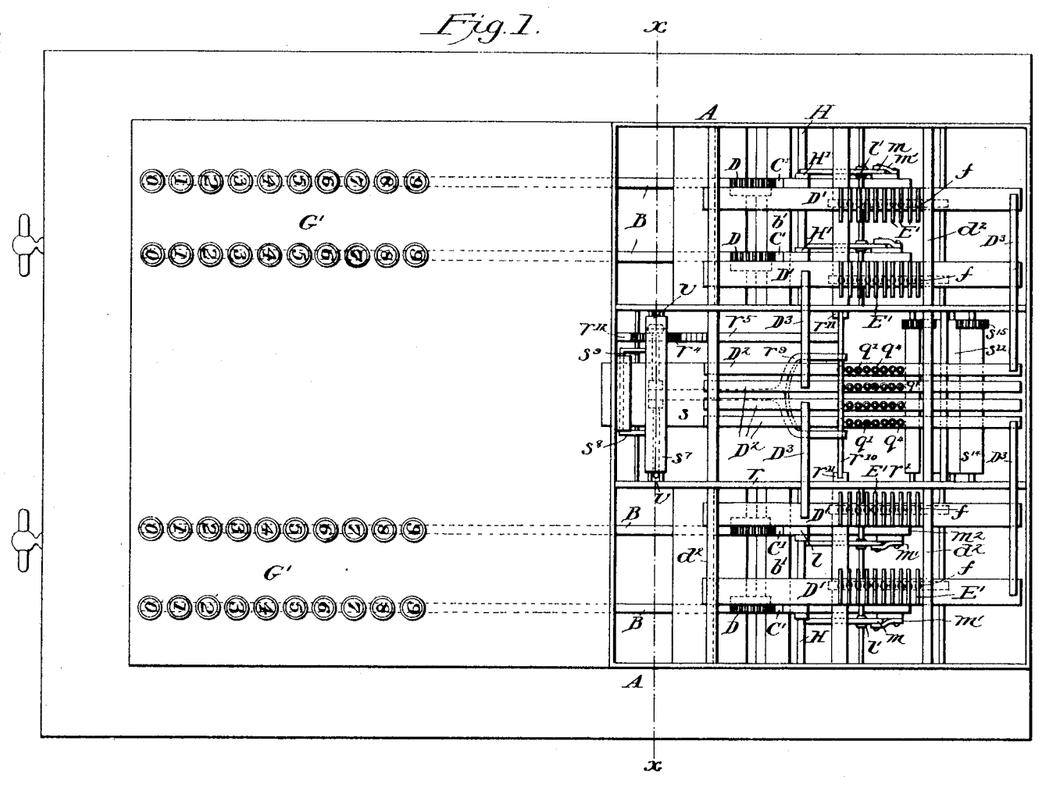
Figure 1 is a plan view with the top of the casing removed.
Figure 2:
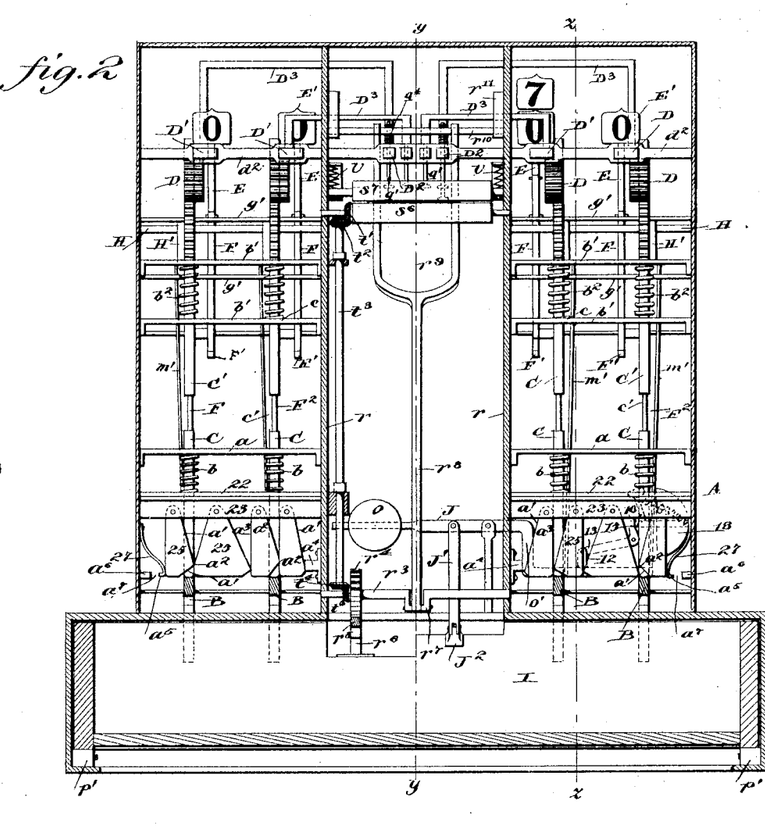
Fig. 2 is a section on the line $x\,x$ of Fig. 1.
Figure 4:
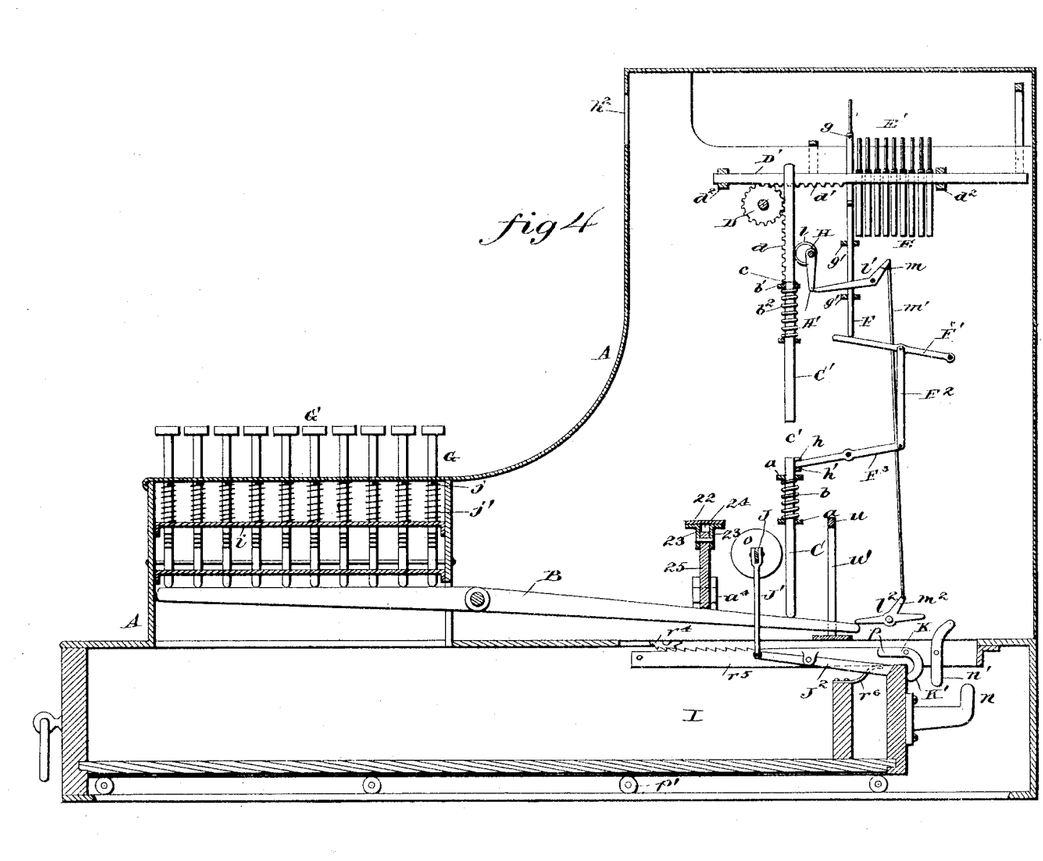
Fig. 4 is a section on the line $z\,z$ of Fig. 2.
Figure 5:
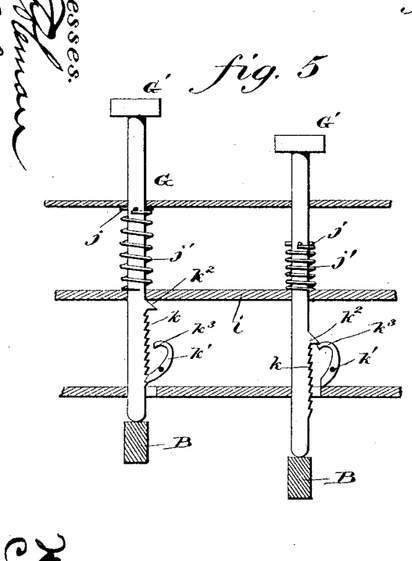
Fig. 5 is a detail section of the keys.
Figures 5, 6:
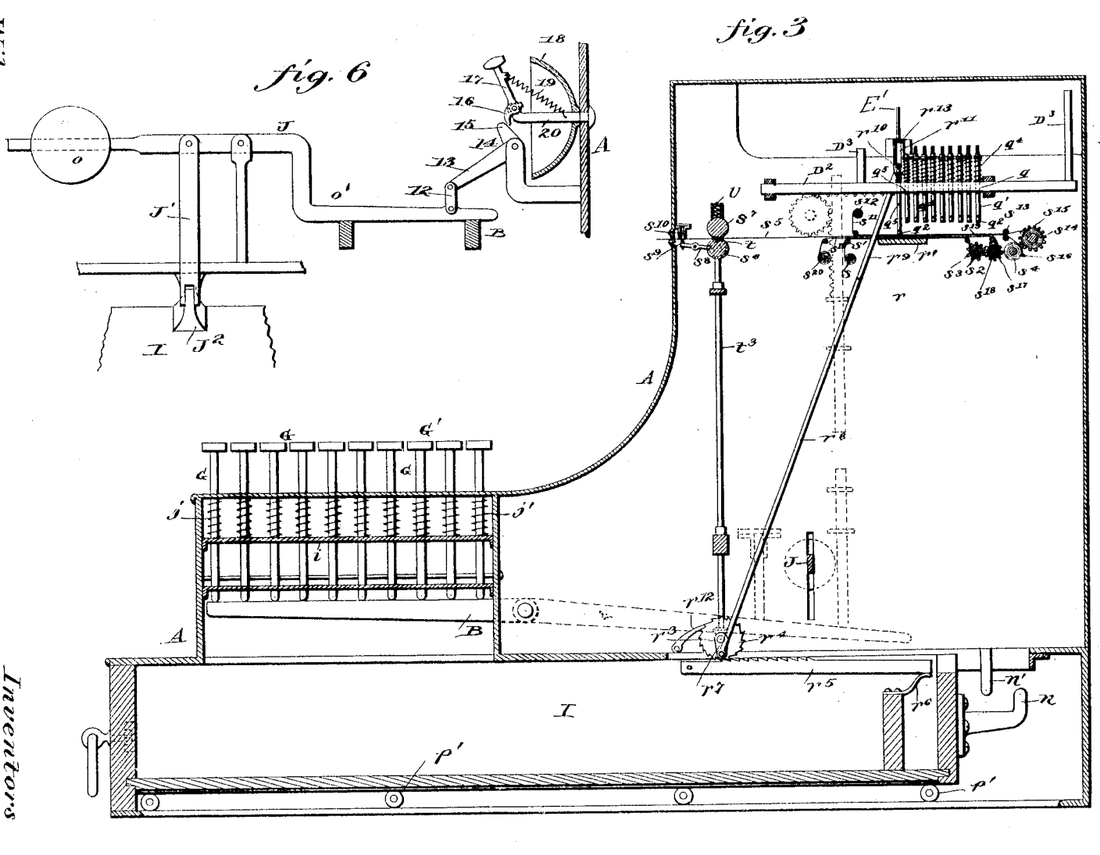
Fig. 6 is a detail view of the drawer-locking and alarm-sounding devices.

To the framework of the machine a bar 22 is secured. To the bar 22 two parallel plates 23 are secured and adapted to project downwardly, a space 24 being left between them. In the space 24 between the plates 23 a series of depending wings 25 are pivoted, said wings being of a length sufficient to project down to the key-levers B, as clearly shown in Figs. 2 and 4. The wings 25 are preferably arranged in two series, leaving a space between the two series for the accommodation of the standards $r$ and the rod $r^8$ projecting downwardly from the yoke $r^9$. In order that the key-levers shall be arranged a proper distance apart, at least one wing of each series is preferably made of greater width than the others. Each wing 25, in general form, is preferably tapering, and said wings are pivotally supported between the plates 23 at their smaller ends. The larger end of each wing is made at one side with an inclined edge $a'$, terminating at its upper end in a point $a^2$, the point of one wing normally resting against the straight edge $a^3$ of the adjacent wing. The wings are arranged directly over the key-levers B and the wing at one end of each series bears against a block $a^4$ secured to the framework. The wings are retained in their normal positions by means of springs 27 at one end of each series of wings. The springs 27 are secured to the framework and are bent, substantially as shown in Fig. 2, toward the end of the series of wings 25, and from their bearing on the end wing of each series said springs are bent to produce arms $a^5$, adapted (when the key-lever is operated) to strike blocks $a^6$, secured to the framework, the space $a^7$ between the block $a^6$ and the end of the arm $a^5$, when the parts are in their normal positions, being equal to the thickness of a key-lever. From this construction and arrangement of parts it will be seen that when a key-lever is depressed it will first come into contact with the inclined edge $a'$ in proximity to the lower end of a wing 25 and then force its way between two wings and swing all the wings of the series to the right of the key-lever which has been pressed against the resistance of the spring 27 and until the arm $a^5$ of said spring strikes the block $a^6$, the wings to the left of the depressed key-lever being prevented from swinging by the block $a^4$. Should it be attempted to depress two key-levers of a series simultaneously they will both come into contact with the inclined edge of the wings directly above them, and as each key-lever tends to swing the wing directly above it to the right and as the block $a^4$ prevents the wings from swinging to the left the key-lever on the right will prevent the wing on the left from being swung to the right, and thus locks the key below it. Consequently if more than one key-lever be depressed at one time all the key-levers will be locked, but upon depressing only one key-lever of a series the indicator can be operated. When the key-lever which shall have been depressed is permitted to again assume its normal position, the wings displaced will be made to resume their normal positions by means of the spring 27, in an obvious manner.

In order to insure the proper vertical movement of the key-lever B a plate $u$ is secured within the casing or framework A and provided with elongated slots $u'$, through which and by which said key-levers will be guided in their movements.

Having fully described our invention, what we claim as new, and desire to secure by Letters Patent, is—

1. The combination with a framework, a key lever fulcrumed at or near its middle, sliding spring cushioned key bars located in position to vibrate the lever when slid inward, of targets, means for shifting them to different positions, and means extending from the key lever to one of the targets whereby to operate one of the targets with each operation of the lever, substantially as set forth.

2. In a cash indicator, the combination with a sliding spring sustained key-bar having ratchet teeth projecting therefrom and integral therewith, and a large tooth also projecting therefrom, of a pivoted dog adapted to engage said ratchet teeth to prevent the return of the key-bar after a partial depression of the same, said dog having an arm or ear projecting therefrom adapted to be struck by the large tooth on the key-bar to release the dog from the ratchet teeth when the key-bar shall have completed its downward movement, substantially as set forth.

3. In a cash indicator, the combination with a key lever and a horizontally movable bar having perforations therein, of a series of target bars passing through said perforations, a vertically movable lifting bar, and mechanism interposed between said key lever and the horizontally and vertically movable bars for sliding said horizontally movable bar and raising the vertically movable lifting bar, substantially as set forth.

4. The combination with a horizontally movable bar, targets having sliding connection therewith, and means for sliding the target bar, of key lever, a pair of vertically sliding rods, one of which is adapted to raise the target located above it, and means connecting these sliding rods whereby one is operated by the other, substantially as set forth.

5. The combination with a horizontally movable bar, targets having sliding connection therewith and means for sliding the movable bar, of key lever, key rod, a sliding rod for raising the target located in its path, a spring actuated slide rod in position to be slid by the key lever, and a pair of connected levers for communicating motion from one slide rod to the other, substantially as set forth.

6. In a cash indicator, the combination with a key lever and means for operating the same, of a horizontally movable toothed bar, a series of target bars carried by said horizontally movable bar, a lifting bar adapted to force said target bars upwardly, devices controlled by the key lever for operating said lifting bar, a pinion adapted to mesh with the teeth of the horizontally movable bar, and devices controlled by the key lever for rotating said pinion, substantially as and for the purpose set forth.

7. In a cash indicator, the combination with a key lever and means for operating the same, of a horizontally movable toothed bar, a series of target bars carried by said horizontally movable bar and adapted to have a vertical movement, a pinion adapted to mesh with the teeth of the horizontally movable bar, a vertical toothed bar adapted to mesh with said pinion, devices controlled by the key lever for raising said vertical bar, a lifting bar adapted to force said target bars upwardly, and means for automatically operating said lifting bar, substantially as set forth.

8. In a cash indicator, the combination with a key lever and means for operating the same, of a horizontally movable bar, a series of vertically movable target bars carried thereby, a vertically movable bar, means for transmitting motion from said vertically movable bar to the horizontally movable bar, means for retaining said vertically movable bar elevated, devices for automatically releasing said vertically movable bar, a spring for returning it to its normal position, a lifting bar adapted to raise the target bars and means for automatically operating said lifting bar, substantially as set forth.

9. In a cash indicator, the combination with a key lever and means for operating the same, of a horizontally movable bar, a series of vertically movable targets carried thereby, a vertically movable bar, means for transmitting motion from the vertically movable bar to the horizontally movable bar, a friction clutch to retain the vertically movable bar elevated, means for operating said clutch to release the vertically movable bar, a lifting bar and means for operating said lifting bar to elevate the target bars, substantially as set forth.

10. In a cash indicator, the combination with a key lever and means for operating the same, of a horizontally movable bar, a series of vertically movable target bars carried thereby, a vertically movable bar, means for transmitting motion from the vertically movable bar to the horizontally movable bar, an eccentric adapted to retain the vertically movable bar elevated, means for automatically turning said eccentric to release the vertically movable bar when the machine is again operated, a lifting bar and means for operating said lifting bar to raise the target bars, substantially as set forth.

11. In a cash indicator, the combination with a key lever and means for operating the same, of a vertically movable bar adapted to normally rest on said key lever, a spring for returning said bar to its normal position, a vertical toothed bar, a horizontally movable toothed bar carrying a series of target bars, a pinion interposed between said toothed bars, a spring for returning the vertically movable toothed bar to its normal position, a lifting bar, and means for operating said lifting bar to raise a target bar, substantially as set forth.

12. In a cash indicator, the combination with a key lever, and a vertically movable spring-sustained bar resting on said key lever, of a vertically movable lifting bar, a series of target bars, means for automatically moving said target bars over the lifting bar, and means connected with and operated by the vertically movable spring-sustained bar for operating said lifting bar to raise and lower the target-bars, substantially as set forth.

13. In a cash indicator, the combination with a key lever, and a vertically-movable spring-sustained bar resting on said key lever, of a vertically movable lifting bar, a series of target bars, means for automatically moving said target bars over the lifting bar, a pivoted lever adapted to sustain said lifting bar, a link pivotally connected to said lever, a lever pivoted between its ends and connected at one end to said link and at its other end adapted to be engaged by projections on the vertically movable spring sustained bar, substantially as set forth.

14. In a cash indicator, the combination with a drawer, and a lever pivoted above the point where the inner end of the drawer stops when the latter is closed, one end depending behind the drawer and the other projecting forward over the rear end of the drawer of a locking bar, its free end normally in engagement with the drawer and in the same plane with said lever whereby to rock the latter when it is struck by the locking bar, a key-lever, lever J having one end extending in close proximity to the key lever, and means for connecting the lever J to the locking bar, substantially as set forth.

15. In a cash indicator, the combination with a key lever, a horizontally movable bar, and means comprising a toothed bar and a toothed wheel interposed between the horizontally movable bar and the key lever and operated by the latter for causing said bar to move when the key lever is operated, of a series of vertically movable type bars carried by said horizontally movable bar, a plate under said type bars against which paper is carried, and means for moving said type bars to cause the type thereon to print on the paper on said plate, substantially as set forth.

16. In a cash indicator, the combination with a key lever, a horizontally movable bar, and means interposed between the horizontally movable bar and the key lever for moving said bar when the key is operated, a series of target bars carried by said horizontally movable bar, means for forcing said target bars upwardly, a series of type bars also carried by a horizontally movable bar, type carried by said type bars, a plate or table, against which paper is carried, and means for causing the type to print on said paper a figure corresponding with that displayed by the elevated target, substantially as set forth.

17. In a cash indicator, the combination with a key lever, a horizontally movable bar and means comprising a toothed bar and a toothed wheel interposed between the horizontally movable bar and the key lever and operated by the latter for moving said bar back and forth, of a series of movable type bars carried by said horizontally movable bar, type on said type bars, a plate adapted to support paper, a yoke adapted to engage said bars when moved in line therewith, and means for operating said yoke to cause the type to print on the paper on said plate, substantially as set forth.

18. In a cash indicator, the combination with a key lever, a horizontally movable bar and means comprising a toothed bar and a toothed wheel interposed between the horizontally movable bar and the key lever and operated by the latter for moving said bar back and forth, of a series of movable type bars carried by said horizontally movable bar, type carried by said type bars, a yoke adapted to engage said type bars when moved in line therewith, a plate or table adapted to support paper, a shaft, and means connected with said shaft to cause said yoke to pull a type against the paper on said plate or table, substantially as set forth.

19. In a cash indicator, the combination with a key lever, a horizontally movable bar and means comprising a toothed bar and a toothed wheel interposed between the horizontally movable bar and the key lever and operated by the latter for moving said bar back and forth, of a series of movable type bars, type carried by said type bars, a yoke adapted to engage said type bars when moved in line therewith, and means for automatically operating said yoke to depress the type bars, substantially as set forth.

20. In a cash indicator, the combination with a key lever, a horizontally movable bar and means comprising a toothed bar and a toothed wheel interposed between the horizontally movable bar and key lever and operated by the latter for causing said bar to move back and forth, of a series of movable type bars, type carried thereby, a plate or table over which said type bars are adapted to be moved, said plate or table being adapted to support paper, a yoke adapted to engage the type bars when moved in line therewith, guides for said yoke, and means for operating said yoke to cause a type to print on the paper on said plate or table, substantially as set forth.

21. In a cash indicator, the combination with a horizontally movable bar, a key lever and means comprising a toothed bar and a toothed wheel interposed between said bar and key lever and operated by the latter for causing the bar to move back and forth, of a series of spring sustained vertically movable type bars carried by said horizontally movable bar, a type carried by each type bar, a plate or table adapted to support paper and means for causing said type to print on said paper, substantially as set forth.

22. In a cash indicator, the combination with a horizontally movable bar, a key lever and means comprising a toothed bar and a toothed wheel interposed between said bar and key lever and operated by the latter for causing the bar to move back and forth, of a series of spring sustained vertically movable type bars carried by said horizontally movable bar, a type carried by each type bar, a plate or table adapted to support paper and means for automatically causing said type to print on said paper when the drawer is opened, substantially as set forth.

23. In a cash indicator, the combination with a bar carrying a series of type bars having type thereon, a sliding yoke adapted to depress said type bars, means for supporting paper and a drawer, of a rod projecting from said yoke, a shaft, a crank arm carried by said shaft and connected to said rod, a ratchet wheel also carried by said shaft and a ratchet bar carried by the drawer and adapted to mesh with said ratchet wheel, substantially as set forth.

24. In a cash indicator, the combination with a bar carrying a series of type bars having type thereon, a sliding yoke adapted to depress said type bars, means for supporting paper, and a drawer, of a rod projecting from said yoke, a shaft, a crank arm carried by said shaft and connected with said rod, a ratchet wheel also carried by said shaft, a ratchet bar pivoted at one end to the drawer and adapted to mesh with said ratchet wheel, and a spring secured at one end to the drawer and bearing at its other end against the free end of the ratchet bar, substantially as set forth.

25. In a cash indicator, the combination with a drawer and a series of type, of means for supporting a strip of paper, friction wheels between which said strip is adapted to pass, mechanism intermediate of one of the friction wheels and the drawer, whereby, when the drawer is opened, said friction wheel will be operated to slide the paper to be fed, means for severing said strip and means carried by said friction wheel for operating said cutting mechanism, substantially as set forth.

26. In a cash indicator, the combination with type and a drawer, of means for supporting two strips of paper and an ink ribbon below the type, devices adapted to be operated automatically by the movement of the drawer, and a cutting device adapted to automatically cut one of said strips, substantially as set forth.

27. In a cash indicator, the combination with type, a table and a drawer, of a drum adapted to carry a strip of paper, friction wheels adapted to draw the strip of paper over said table, a bevel pinion carried by one of said friction wheels, a shaft carrying a pinion to mesh with a pinion on the friction wheel, a horizontal shaft mounted near the drawer, a pinion carried by said horizontal shaft and adapted to mesh with a pinion on the lower end of the first mentioned shaft, a ratchet wheel carried by the horizontal shaft and a ratchet bar carried by the drawer and adapted to mesh with said ratchet wheel, substantially as set forth.

28. In a cash indicator, the combination with several series of key rods or bars, of a single key lever for each series of key rods or bars, several series of target bars carrying targets, the targets of one series corresponding with the key buttons on the key rods or bars of the same series, and mechanism interposed between each key lever and the corresponding series of targets for operating the same, when a key is depressed, substantially as set forth.

In testimony whereof we have signed this specification in the presence of two subscribing witnesses.

HENRY G. WALTER.
CHARLES F. WALTER.

Witnesses:
WM. A. WILCOX,
SAML. I. FOOTE.